Aug. 20, 1935.  H. SINCLAIR  2,011,735
HYDRAULIC COUPLING OR GEAR
Filed July 20, 1933  2 Sheets-Sheet 1
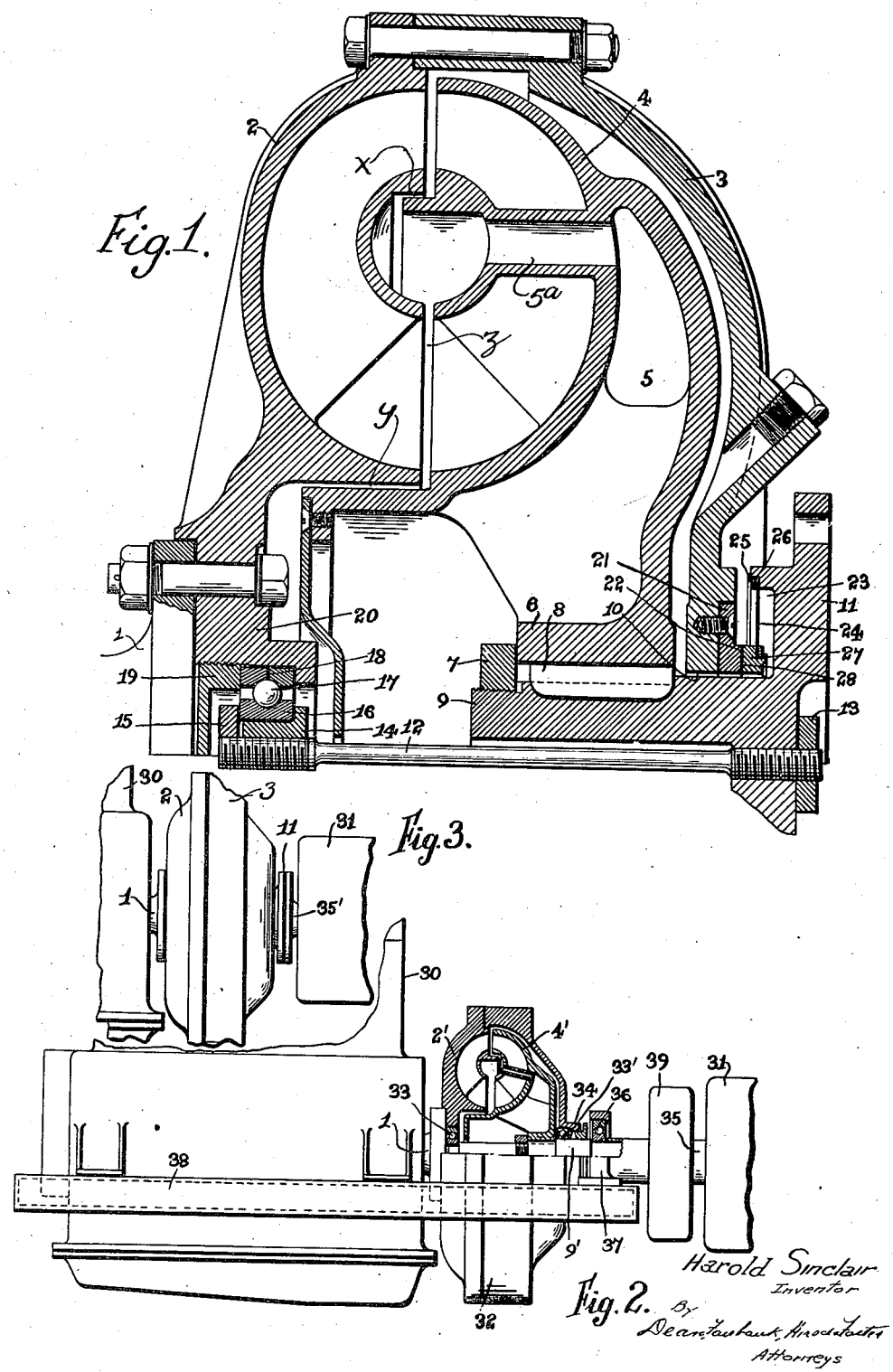

Patented Aug. 20, 1935

2,011,735

UNITED STATES PATENT OFFICE 2,011,735

HYDRAULIC COUPLING OR GEAR

Harold Sinclair, Surbiton Hill, England

Application July 20, 1933, Serial No. 681,321
In Great Britain August 3, 1932

14 Claims. (Cl. 60—54)

The present invention relates to hydraulic couplings or gears of the kinetic type, that is to say of the type having an impeller, a runner and a fluid circulating between the impeller and runner and serving to couple them together.

It is common practice to construct Vulcan hydraulic couplings of this type in such a way as to permit some relative lateral and angular movement to take place between the driving and driven shafts, thus allowing misalignment to occur without risk of the shafts binding in their bearings. The majority of Vulcan couplings so constructed are of the type adapted to be filled and emptied while they are running and are housed within fixed sheet steel casings, the driving and driven shafts being carried in independent external bearings which take the hydraulic thrust due to the coupling, so that it is possible to use labyrinth type glands which permit the required relative movements of the driving and driven shafts.

In other examples, such as Vulcan-Sinclair couplings of the so-called "scoop tube" type adapted to work with variable liquid content, as described in my Patent No. 1,859,607, the running clearances throughout are large enough to permit of slight lateral and angular misalignment between the impeller and runner axes, and the internal thrust bearings used are of such design as to take up the hydraulic thrust under these working conditions. United States Patent 1,389,562 also discloses a coupling of the kinetic type which is provided with an impeller member and a runner member so mounted as to be capable of slight angular and lateral deviation during operation of the coupling.

With Vulcan couplings which work with a substantially constant quantity of liquid, for example, the well known "fluid fly wheel"—hereinafter referred to as the "constant-filling" type—according to my British Patent No. 285,970, the problem is rather different from when the filling is variable, because the gland must be designed to be substantially oil tight both when rotating and when stationary.

It is an object of the present invention to provide improved means for allowing relative movement to take place, both laterally and angularly, between the axes of the impeller and runner shafts, whilst limiting the relative axial movement and taking up all hydraulic thrust within the coupling, the invention being especially but not exclusively applicable to hydraulic couplings of the constant-filling type.

According to the present invention there is provided within a hydraulic coupling or gear of the kinetic type and between the driving and driven parts thereof a connection adapted to permit relative rotation between the driving and driven shafts and to transmit axial thrusts in both directions between the impeller and runner elements, and this connection is deformable, that is to say, it is either of flexible material or of articulated construction, so as to permit relative movement of the axes of said elements both angularly and laterally. The connection preferably consists of a relatively thin and flexible rod which may be of spring steel, fixed directly or by the agency of an intermediate member to one of the elements and coupled to the other element through a thrust bearing adapted to take thrust in both axial directions. The rod, by its flexibility, permits the required lateral and angular displacements of the axes of the elements and yet is capable of transmitting thrust in both directions.

Thus with the arrangement according to the present invention, all hydraulic thrust is taken up in both directions inside the coupling and the provision of a satisfactorily oil-tight gland of simple and reliable construction is rendered possible. In many cases, e. g. Diesel locomotives etc. it is possible to eliminate one or more of the external universal joints or flexible couplings since sufficient flexibility is provided by the improved hydraulic coupling itself.

The gland permitting the required lateral and angular movement of the axes of the elements (together with slight axial movement to accommodate pressure and temperature effects) may be of the diaphragm type comprising bearing surfaces lying in a plane substantially normal to the said axes (so that slight lateral and angular movement between the axes does not materially affect oil-tightness) and preferably so arranged that the bearing pressure between the said surfaces increases as the fluid pressure within the coupling increases.

The invention will be further described with reference to the accompanying drawings, in which Fig. 1 is a sectional side elevation of part of one form of my improved coupling.

Fig. 2 is a diagrammatic part-sectional side elevation of part of the power-transmission system of an internal-combustion engine driven locomotive comprising a hydraulic coupling not provided with the improvement introduced by the present invention.

Fig. 3 is a diagrammatic side elevation of a power transmission system similar to Fig. 2 except that my improved coupling is employed.

Fig. 1 shows a coupling of the constant-filling type, and provided with an internal reservoir, and a duct 5a whereby liquid is transferred automatically between the working circuit and the reservoir in accordance with variation in the operating conditions, as described in my United States Patent No. 1,963,720.

Figure 4:
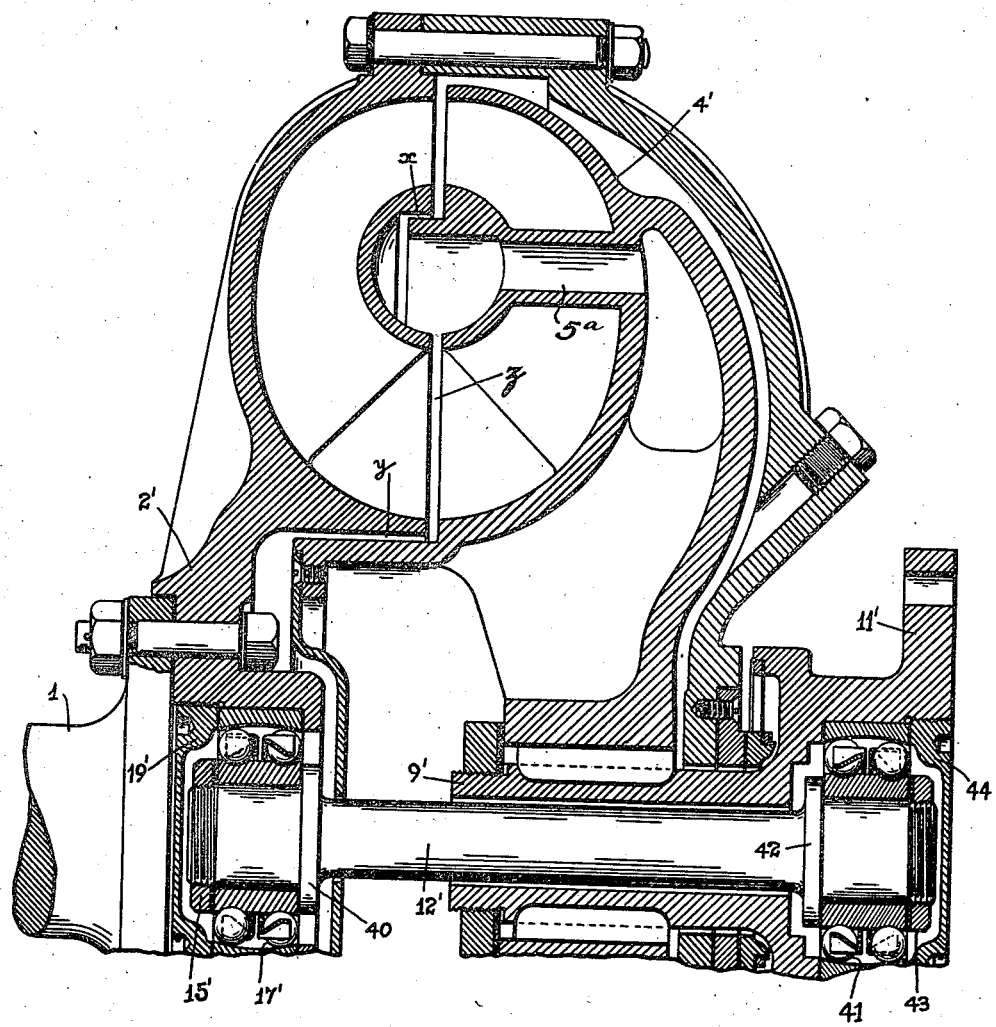
Fig. 4 is a sectional side elevation of part of an alternative form of my improved coupling.

To a driving shaft 1 is bolted a vaned impeller element 2 to the periphery of which is bolted a dished casing 3 enclosing a vaned runner element 4. A reservoir chamber 5 is formed integral with the runner 4, the runner and reservoir together forming a driven member having a boss 6 secured by a nut 7 and a key 8 to a short hollow driven shaft 9 which projects through a hole 10 in the casing 3 and terminates in a coupling flange 11. A clearance is provided between the shaft 9 and the casing 3 sufficient to permit a limited angular and lateral deviation of the runner and impeller axes; in the example shown the coupling has an over-all diameter of about 2 ft. and this clearance may be of the order of 1/16 in. The radial clearances between the impeller and the runner at x and y are about 3/32 in., and the axial clearance at z may be about 1/8 in.

The bore of the driven shaft 9 is reduced at its outer end and is tapped to receive the threaded end of a rod 12 of spring steel which projects into the coupling, being secured by a lock-nut 13. The inner end of the rod 12 is fixed by means of a threaded adaptor 14 and a nut 15 to the inner race 16 of a ball bearing 17 adapted to take thrust in both directions, the outer two-part race 18 of this bearing being secured by a threaded plug 19 within the boss 20 of the impeller 2.

A ring 21 which is preferably of hardened steel is attached to the casing 3 surrounding the hole 10, and the outer surface of this ring is ground at 22 normal to the axis of the impeller. The side of the flange 11 nearer the casing 3 is provided with a recess 23 within which is fixed a flexible annular diaphragm 24 which may be of steel about 0.010 in. thick. A fluid-tight joint between the diaphragm and the flange is secured by rolling a lip 25 on the flange over a packing ring 26 placed against the diaphragm. To the inner edge of the diaphragm is fixed, by a similar rolled joint, a ring 27, which may be of bronze, and which is provided with a ground face 28 adapted to bear evenly against the ground face 22 of the ring 21 on the casing 3. Pressure within the coupling acts on the side of the diaphragm remote from the casing and thus serves to press the ground face 28 against the face 22 and thus to maintain or increase the resistance to leakage as the internal pressure rises.

The flexible rod 12 connecting the runner 4 with the ball thrust bearing on the impeller 2 permits both angular and lateral movement of the driven shaft 9 relatively to the driving shaft 1, whilst taking up all hydraulic thrust loads within the coupling, and it is sufficiently flexible to prevent the transfer of material journal load between the driving and driven shafts. The required movements are in practice small and the flexible diaphragm gland ensures that, for such movements, the ground surfaces remain in good contact with one another, thus serving as a liquid-tight gland. A gland of this kind will not, however, remain liquid-tight if undue axial movement (for example more than 0.01 in.) takes place between the driving and driven elements. If this type of gland is used therefore, the flexible connection between these elements should be arranged to prevent relative axial movement between the impeller and runner in excess of the above mentioned amount.

However, if greater freedom for axial movement is desired, any other suitable form of gland may be used.

In the construction shown in Fig. 4, an articulated connection is provided between the impeller 2' and the runner 4'. It takes the form of a relatively rigid rod 12' coupled to the driving and driven parts of the coupling by self-aligning ball bearings 17' and 41 respectively, which transmit thrust in both directions while permitting angular deviation of the rod 12' relative to the driving and driven parts. The outer race of the bearing 17' is secured to the impeller 2' by a threaded plug 19', and the inner race is held against a shoulder 40 on the rod 12' by a nut 15'. The outer race of the bearing 41 is secured to the flanged end 11' of the hollow shaft 9' by a threaded plug 44, the inner race being held against a shoulder 42 on the rod 12' by a nut 43. The coupling is otherwise similar to that shown in Fig. 1.

The coupling described with reference to Fig. 1 is particularly suitable for use between internal combustion engines and change-speed gear boxes on locomotives, railcars, automobiles, and cranes, and also between portable engines and air compressors and on all kinds of machinery where misalignment of the shafts is liable to arise in service.

For example, in the locomotive transmission system shown in Fig. 2, the engine 30 is connected to a change-speed gear box 31 by a hydraulic coupling 32 of the kind having internal journal bearings 33 and 33' locating the runner 4' relatively to the impeller 2', and a stuffing-box gland 34, the input shaft 35 of the gear box 31 being carried in two or more bearings and thus being self-supporting. With such an arrangement it has been found desirable to provide a bearing such as 36 which serves to maintain the driven shaft 9' of the hydraulic coupling accurately aligned with the driving shaft 1, this additional bearing being conveniently carried in a housing 37 fixed to a sub-frame 38 which carries the engine 30, and also to provide one or more mechanical flexible couplings (one being shown in Fig. 2 and denoted by 39) which permit both angular and lateral deviation of the axis of the gear box input shaft relative to the axis of the hydraulic coupling 32.

Where my improved hydraulic coupling is used in a corresponding arrangement, the additional bearing 36, the subframe 38, and the mechanical flexible coupling 39, may be omitted without inconvenience, as shown in Fig. 3. With this improved arrangement the driven shaft of the hydraulic coupling is rigidly connected, for example by the flange coupling 11, to the input shaft 35' of the gear box 31. Nevertheless the hydraulic coupling permits relative movement of the engine and gear box, due for example to distortion of the locomotive frame, and the novel connection within the coupling ensures that the impeller and runner are not moved out of their proper longitudinal relationship as a result of thrust loads due either to the action of the coupling liquid or to the engine or gearing.

I claim:
1. A hydraulic power transmitter of the kinetic type comprising a rotatable driving part, a rotat- able driven part, and a rotatable flexible connection between said parts, said connection being disposed within said transmitter and being adapted to permit relative rotation of said parts, to transmit axial thrusts in both directions between said parts, and to permit relative movement of the axes of said parts both angularly and laterally.

2. A hydraulic power transmitter of the kinetic type comprising a rotatable driving part, a rotatable driven part, and a rotatable flexible connection between said parts, said transmitter being of the kind that operates with a substantially constant liquid content, and said connection being disposed within said transmitter and adapted to permit relative rotation of said driving and driven parts, to transmit axial thrusts in both directions between said parts, and to permit relative movement of the axes of said parts both angularly and laterally.

3. A hydraulic power transmitter of the kinetic type, comprising a rotatable driving part, a rotatable driven part, said parts having radial and axial clearances permitting relative movement of the axes thereof both angularly and laterally, a bearing capable of transmitting thrust in both directions and having two elements one of which is rigidly attached to one of said transmitter parts, and rotatable means connecting the other of said bearing elements to the other of said transmitter parts, while permitting radial displacement of said bearing relative to said other transmitter part.

4. A hydraulic power transmitter of the kinetic type comprising a rotatable driving part, a rotatable driven part, the axes of said parts being capable of both angular and lateral relative movement, and a flexible rod rigidly connected to one of said parts and coupled to the other of said parts by a bearing which is adapted to take thrusts in both directions.

5. A hydraulic power transmitter of the kinetic type comprising two relatively rotatable vaned elements wherein the working liquid operates, a rotatable flexible connection between said elements, which is disposed within said transmitter and which is adapted to permit relative movement of the axes of said elements both angularly and laterally while transmitting axial thrusts in both directions between said elements, and a flexible gland arranged to prevent leakage of working liquid between said elements.

6. A hydraulic coupling comprising a driving part having a driving shaft and a vaned impeller element fixed thereto, a driven part having a driven shaft and a vaned runner element fixed thereto, said impeller and runner elements being juxtaposed to form an annular working circuit, and a rotatable flexible connection between said driving and driven parts, said connection being disposed within said coupling and adapted to permit relative rotation of said driving and driven shafts, to transmit axial thrusts in both directions between said impeller and runner elements, and to permit relative movement of the axes of said elements both angularly and laterally.

7. A hydraulic coupling comprising a driving part having a driving shaft and a vaned impeller element fixed thereto, a driven part having a driven shaft and a vaned runner element fixed thereto, said impeller and runner elements being juxtaposed to form an annular working circuit and the axes of said shafts being capable of both lateral and angular relative movement, and a flexible rod rigidly connected to one of said parts and coupled to the other of said parts by a bearing which is adapted to take thrusts in both directions.

8. A hydraulic coupling comprising a driving part having a driving shaft and a vaned impeller element fixed thereto, a driven part having a driven shaft and a vaned runner element fixed thereto, said impeller and runner elements being juxtaposed to form an annular working circuit, a casing fixed to one of said vaned elements, enclosing the other of said vaned elements, and having an aperture accommodating the shaft to which is fixed said other vaned element, said coupling parts having radial and axial clearances permitting relative movement of their axes both angularly and laterally, a diaphragm gland arranged to prevent leakage at said aperture, and a rotatable flexible connection between said driving and driven parts, said connection being disposed within said coupling, including a bearing capable of transmitting thrusts in both directions, and serving to restrict longitudinal relative movement of said parts to an amount that can be accommodated by said gland.

9. A hydraulic coupling of the kinetic type comprising a rotatable driving part, a rotatable driven part, said parts being juxtaposed to form a hydraulic working circuit and being so arranged as to operate with a substantially constant liquid content, a flexible gland arranged to prevent leakage of working liquid between said driving and driven parts, and a rotatable flexible connection disposed within the coupling, adapted to permit relative rotation of said parts, to transmit axial thrusts in both directions between said parts, and to permit relative movement of the axes of said parts both angularly and laterally.

10. In a power transmission system comprising a driving machine and a driven machine so mounted as to be substantially aligned but liable to misalignment, the provision of a hydraulic power transmitter of the kinetic type having a vaned impeller element rigidly connected to the shaft of the driving machine, a vaned runner element rigidly connected to the input shaft of the driven machine, and a deformable connection between said elements, said connection being disposed within said transmitter, including a bearing capable of transmitting axial thrusts in both directions, and permitting relative movement of the axes of said shafts both angularly and laterally.

11. In a power transmission system comprising a driving machine and a driven machine so mounted as to be substantially aligned but liable to misalignment, the provision of a hydraulic coupling of the kinetic type having a vaned impeller element rigidly connected to the shaft of the driving machine, a vaned runner element rigidly connected to the input shaft of the driven machine, a casing fixed to one of said coupling elements, enclosing the other of said elements, and sealed by means of a diaphragm gland with respect to the shaft to which said other element is connected, and a rotatable flexible connection disposed within said coupling and adapted to permit relative rotation of said impeller and runner elements and relative movement of the axes of said shafts both angularly and laterally and to transmit axial thrusts in both directions between said elements in such manner as to limit longitudinal relative movement of said elements.

12. A hydraulic power transmitter of the kinetic type comprising a rotatable driving part, a rotatable driven part, and a rotatable rod connected between, and substantially co-axial with said parts, and capable of displacement relative to both of said parts so as to permit the axis of one of said parts to move, both angularly, and laterally, relatively to the axis of the other of said parts, said rod being coupled to at least one of said parts by a bearing which serves to transmit axial thrusts in both directions between said parts while permitting relative rotation thereof.

13. A hydraulic power transmitter of the kinetic type comprising a rotatable driving part, a rotatable driven part, and a rotatable articulated connection between said parts, said connection being disposed within said transmitter, and including a bearing capable of transmitting axial thrusts in both directions between said parts and of permitting relative movement of the axes of said parts both angularly and laterally.

14. A hydraulic power transmitter of the kinetic type and of the kind that operates with a substantially constant liquid content, comprising a rotatable driving part, a rotatable driven part, and a deformable connection between said parts, said connection being disposed within said transmitter, including a bearing capable of transmitting axial thrusts in both directions, and permitting relative movement of the axis of said parts both angularly and laterally.

HAROLD SINCLAIR.